Feb. 13, 1934.   C. D. CHASE   1,946,836
CAMERA
Filed April 27, 1929   3 Sheets-Sheet 1
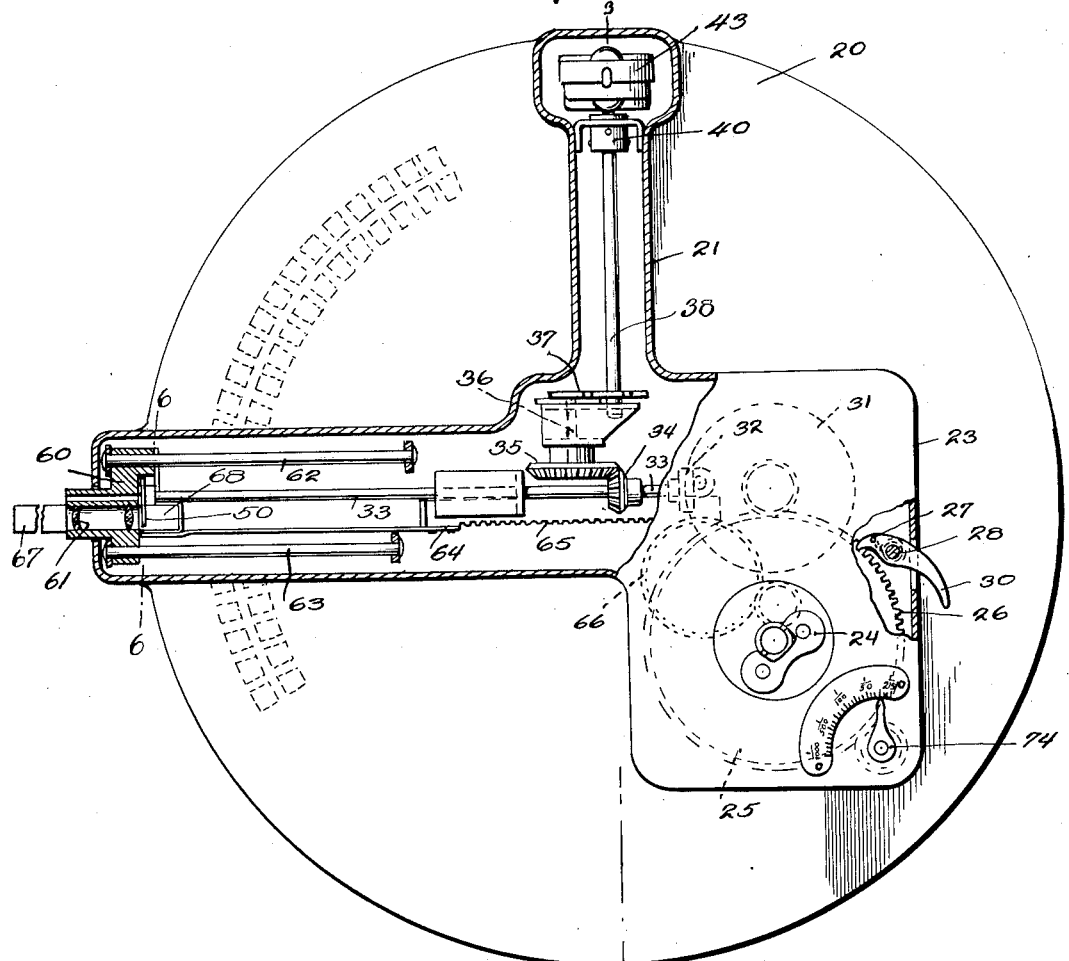
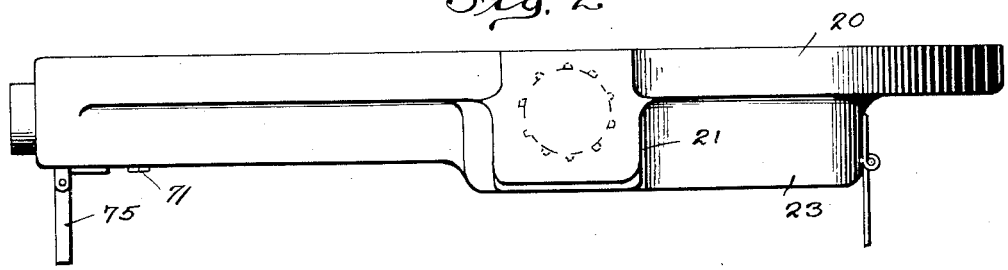
INVENTOR.
Curtis D. Chase
BY
ATTORNEYS

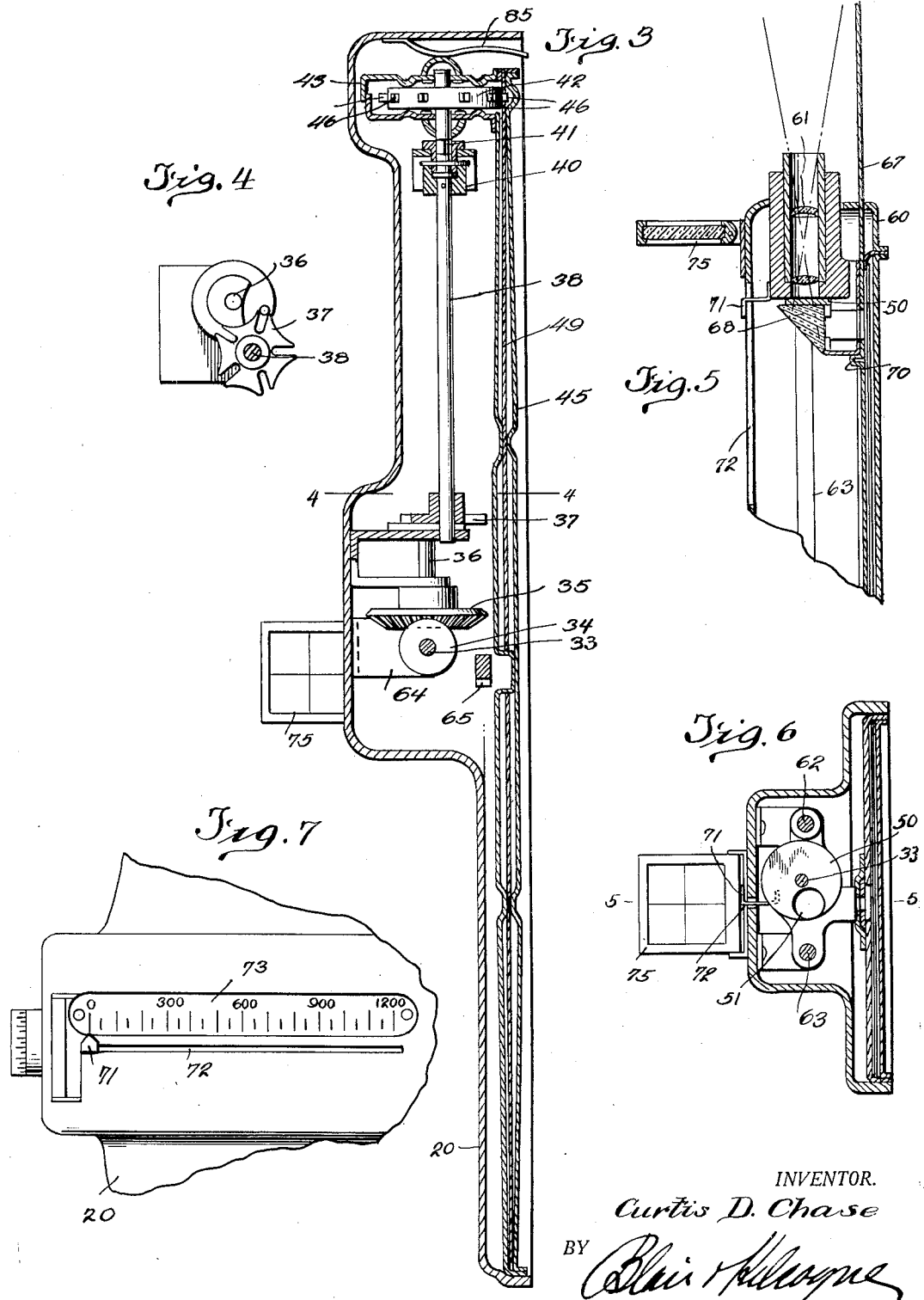

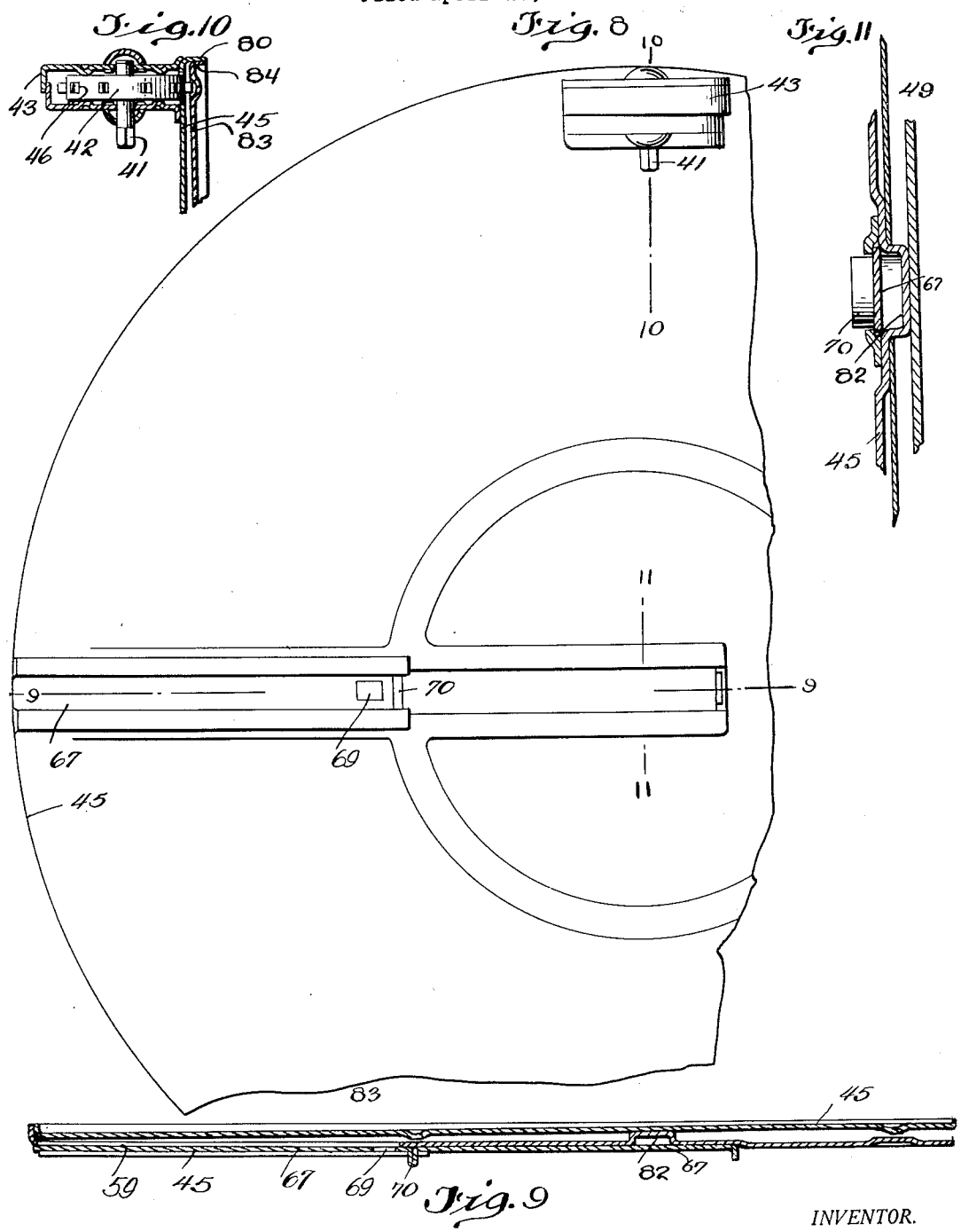

Patented Feb. 13, 1934

1,946,836

UNITED STATES PATENT OFFICE

1,946,836

CAMERA

Curtis D. Chase, Philadelphia, Pa., assignor to Chase Rights Corporation, Philadelphia, Pa., a corporation of Pennsylvania Application April 27, 1929. Serial No. 358,617

22 Claims. (Cl. 88—18.8)

This invention relates to motion picture cameras and more particularly to small portable cameras particularly adapted and designed for taking pictures in a continuous spiral upon a flat disk, film or plate adapted to revolve about a relatively fixed center. While cameras of this type are more particularly adapted for the use of amateurs and home exhibitions, nevertheless the device could be enlarged for commercial applications.

Accordingly, one of the objects of the present invention is to provide a small compact moving picture camera of the above general type which will be highly efficient in use and operation.

A further object is to provide a camera of the above type which will be light in weight and have a minimum of moving parts whereby it may be conveniently transported.

A further object is to provide a camera which may be easily and quickly loaded and in which the pictures will be progressively produced on the film without disturbing the angle of sighting. In other words, the mechanism provides for the sighting and taking of pictures in substantially the plane of the disk upon which the pictures are reproduced.

A further object is to provide means for insuring constant speed of change from one picture to the next as the radii of the individual exposures arranged on a spiral decrease.

A further object is to provide an improved film holder for moving picture cameras of the above type which may be easily and quickly placed in (or removed from) the camera in daylight and in which the proper position of the holder and the film contained therein within the camera is insured.

Another object is to provide an improved motor and gearing for causing desired relative movement of the film with respect to the lens simultaneously in two directions and at the same time actuating the shutter with respect to the lens as the film moves relative thereto.

A further object is to provide means for moving the lens mechanism along its optical axis as distinguished from moving the film with respect to a fixed lens.

Other objects will be in part obvious from the annexed drawings and in part hereinafter indicated in connection therewith by the following analysis of this invention.

This invention accordingly consists in the various steps of the method and their relation each to the other and in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as part of this disclosure, and in such drawings, like characters of reference denote corresponding parts throughout the same.

Figure 1 is an elevational view from the left, partly in section, showing the complete mechanical arrangement.

Figure 2 is a top plan view.

Figure 3 is a vertical sectional view taken on the line 3—3, Figure 1.

Figure 4 is a detailed cross sectional view taken on the line 4—4, Figure 3, to show the Geneva stop mechanism for controlling the film feed.

Figure 5 is a detailed cross sectional view taken substantially on the line 5—5, Figure 6, showing the lens, reflector and slide arrangement.

Figure 6 is a sectional view taken substantially along the line 6—6, Figure 1, showing the lens, slide and shutter arrangement.

Figure 7 is a detailed view showing the footage gage.

Figure 8 is a view of the film holder.

Figure 9 is a sectional view taken substantially on the line 9—9, Figure 8, the film being omitted.

Figure 10 is a detailed cross sectional view taken substantially along the line 10—10, Figure 8.

Figure 11 is a detailed cross section taken substantially on the line 11—11, Figure 8, including the film.

In order that the invention may be more clearly understood, it will be hereinafter described with relation to a small, light and compact camera, especially adapted for taking relatively short footage of scenes or events in spiral form upon a disk film, which film may be easily and quickly loaded into the camera (or removed) and when so placed will be in proper operative position relative to the optical axis of the lens. After the pictures have been taken, the film with the holder may be removed easily and quickly from the camera for developing and subsequent enlargement and reproduction on regulation film, if desired. By using a disk film or plate (preferably the former) many advantages result such as convenience of developing, subsequent handling and storing and the elimination of rewinding. With this understanding in mind, reference is made to Figure 1 of the drawings wherein is shown such parts of the complete device as is necessary to understand the same.

In this view, 20 indicates a generally circular case adapted to receive the film holder such as shown in Figures 8 to 11 and hereafter described in detail. It is sufficient to state that the film is of ordinary disk type adapted to be driven intermittently by means of drive notches adjacent its outer edge.

The case 20 is provided with two radially projecting channel portions extending substantially at right angles from the center, one of which, 21, is adapted to house the film drive mechanism at its outer end, while the other, 22, supports the lens, shutter, feed mechanism and film holder exposure mechanism. Near the center of the case 20 is the motor housing 23, which, in the present case, consists of an appropriately designed clock mechanism which may be wound up by hand and will thereafter run a sufficient length of time to completely unwind the film, that is, to give the desired number of revolutions of the disk. This clock mechanism contained within the housing 23 is adapted to be wound by means of a key 24 for tensioning a spiral band spring within a casing 25. The drum of this casing is provided with a series of teeth 26 adapted to be engaged by a spring pressed pawl 27 pivoted at 28 to the wall of the housing 23. When the projecting end 30 of the pawl is depressed, the pawl 27 is disengaged from the teeth 26 and the drum proceeds to rotate thereby driving a train of gearing suitably proportioned in ratio as hereinafter set forth to drive a beveled gear 31 at a desired rate of speed. This gear 31 cooperates with a beveled gear 32 mounted upon a shaft 33 and in turn drives a second beveled gear 34 meshing with a gear 35 upon a stub shaft 36. A five point Geneva gear 37, shown in detail in Figure 4, permits the driving of a shaft 38 mounted in a suitable bearing 40 near the outer end of the tubular or channel part 21. This bearing, as shown more clearly in Figure 3, is provided with a square recess for receiving a square stub shaft 41 carried by the disk drive wheel 42 positioned within a suitable housing 43 formed with film holder 45. The teeth 46 upon this wheel 42 are adapted to engage peripheral notches in the film 49 (Figure 11). Thus, as the shaft 36 is rotated at a constant speed, and upon proper translation of the lens as will be hereinafter described, then will the film be driven intermittently by the Geneva or equivalent mechanism 37 and the pictures in the outer spirals are arranged on the same radius as those of the inner spiral, that is to say, in radial rows, with a greater space between the pictures of the outer peripheral rows than those pictures nearer the center.

The shaft 33, Figure 1, extends through the bevel gear 34 and has a driving connection at its outer end with a shutter 50, Figure 6, provided with an exposure opening 51 disposed off-center relative to the axis of the shaft 33. This shutter disk revolves past the lens mechanism 60 in the desired relationship with respect to the step by step movement of the film. In other words, as is well known to those familiar with the art, an exposure is made through the opening 51 while the film drive mechanism is stationary by reason of the Geneva stop mechanism shown in detail in Figure 4. Then, while the shutter 50 is revolving the film is advanced one step.

The lens mechanism 60 which is moved radially with respect to the film 49 comprises a frame member carrying the lens 61 and is mounted upon two stationary guide rods 62 and 63, Figures 1 and 6. It will be noted that a slide member 64 is provided with a rack 65 adapted to mesh with a gear 66 of the clock train whereby, as the clock mechanism is wound, by means of a key 24, the slide 64 travels relatively toward the left carrying the lens holder 60 to the extreme left, as shown in Figure 1. This slide also actuates a sliding cover member 67, shown in Figs. 5 and 9, thereby to open an exposure slot 59 arranged radially in the film holder, whereby the pictures may be subsequently taken through a window 69, as shown in Figure 9. The outward movement of the rack 65 carries the lens mechanism 60 and an operatively related prism 68 to the position shown in Figure 5. Thus, on release of the pawl 27 the clock mechanism not only drives the various mechanisms controlling the shutter and film feed, but also moves the lens mechanism 61 and prism 68 inwardly along a radial line and by reason of the engagement of the prism holder with lug 70 formed in the sliding cover 67, the said cover also moves inwardly as the pictures are being taken. This inward movement of the lens mount will also actuate a footage gage, shown in Figure 7. That is, a movable index 71 slides inwardly along an opening or slot 72 adjacent a scale 73 to show the footage taken upon the film, as well as the remaining amount of unexposed film.

The camera is, of course, provided with a speed regulator 74 of any desired type, shown at the right of Figure 1, and a range finder or sight 75 is positioned adjacent the lens, Figure 5, whereby the camera may be more conveniently operated.

While it is believed to be unnecessary to go into the details of the actual clock mechanism used for driving or operating the camera, the various typical ratios desired should be briefly set forth. It is only necessary for the spring gear drum 25 to make about four-fifths of a revolution. This is sufficient through the spur gearing or bevel gears 34 and shaft 33 to the shutter mechanism, to revolve the shutter at approximately 100 R. P. M. Then, by means of a two to one reduction gear 34—35, to the Geneva gear shaft 36, the latter is rotated at approximately 50 R. P. M. Then, by means of the five-pointed Geneva gear 37, this speed is reduced to rotate approximately 10 R. P. M. The drum 42, Figure 3, is provided with ten contact points or teeth 46, which will drive the film. Therefore, one revolution of the film will actuate the shutter 100 times or cause 100 pictures to be taken for each revolution.

Inasmuch as the pictures are taken on a continuous spiral it is necessary that the lens travel radially inwardly as each picture is taken, and in small sized cameras this inward movement is .002187 inches per picture or .2187 inches per revolution of the film. Therefore, a proper reduction must be obtained between the main spring gear 25 and the rack 65 to give .002187 inches of travel of the rack 65 per each turn of the shutter 50.

While many attempts have heretofore been made to manufacture a satisfactory disk camera of the above character, great difficulty has been experienced in providing a commercially practicable article. The mechanism required for moving the film, as distinguished from that required for moving a lens involves many problems and difficulties which are believed to be overcome by the present invention. In other words, a very small and light structure having relatively few parts is all that is required for moving the shutter and lens. Further, by using the prism 68 (Figure 5), the pictures are taken directly in line with the plane of the film 49 instead of along a line at right angles, as heretofore. In other words, the image according to the present invention by means of the prism 68 is directed normally to the optical axis of the lens 61 (which extends parallel to the face of the disk), and on to the disk film. Thus, the focal axis of the lens 61 so far as the images reproduced are concerned, occupies the same relative fixed position with respect to the camera. If, however, the pictures were taken at right angles to the plane of the film then there would result a lateral shifting of the optical axis relative to the camera.

It is believed that the operation of the present construction will be perfectly clear from the above disclosure. Reference, however, is made to Figures 8 to 11 inclusive, in which the film holder is shown more in detail. This film holder comprises a disk-like member 45 flanged at 80 and provided with a central hub or indented portion 82, Figure 11, for engaging a hole in the center of the film 49. The holder is provided with a rear cover plate 83 and the film 49 is mounted to rotate on hub 82 between these two parts. A flange 84 on the back cover plate fits the flange 80 in a light-tight manner. The housing 43 which is carried by the member 45 and containing the drive drum 42 is also light-tight, as well as the slide 67 shown in Figure 11. Thus the film may be loaded or removed from the camera in daylight.

Before the film holder is put into the camera, the operator should actuate the pawl 30 to be sure that the motor is completely unwound and the slide and shutter mechanism returned to its end position towards the right. The film holder is then snapped into place and the motor wound up by turning the key 24. Approximately 10 turns of the key are sufficient to completely tension the spring within the drum 25. The lens is adjusted to the desired focus, the speed regulator 74 is set, and the object to be taken is sighted through the peephole and finder 75. Then the camera is put in action by disengaging the pawl mechanism 30 and through the chain of gearing above described the film will be slowly rotated through the drive mechanism 43 in the desired direction and at proper relative speed with respect to the rotation of the shutter 50. The pictures are taken one after the other at each revolution of the shutter and the film moved step by step to cause the next exposure to be made in proper spaced relation with respect to the previous one. The lens mechanism gradually moves inwardly along the guides 62 and 63 and this inward movement causes the slide 67 to move progressively inwardly and close the opening in the film holder. Thus, when the end of the exposure spiral is reached, the cover plate 67 has been moved inwardly to completely close the exposure slot 59 in the film holder. Then it is merely necessary to raise a holding spring 85 to remove the disk or film holder with its drive gear 42, it being understood that the housing 43 and shaft 41 are removable with the holder from the bearing 40, as indicated in Figure 10. This unit can be taken bodily to a dark room and the film developed at once and a new film put into the holder and the camera reloaded as and when desired.

From the above, it will be seen that the present invention provides a very simple light, compact and inexpensive camera. One of the most desirable features of the camera is the ease and convenience with which the film may be loaded, exposed, developed and stored in envelopes or pockets in albums just as phonograph disk records are kept.

Without further analysis of the invention the foregoing will so fully reveal the gist thereof that others can by applying current knowledge readily adapt it for various applications without omitting certain features that, from the standpoint of the prior art, fairly constitute essential characteristics of the generic or specific aspects of this invention and, therefore, such adaptations should and are intended to be comprehended within the meaning and range of equivalency of the following claims:

I claim:

1. In apparatus of the character described, in combination, a casing adapted to contain a disk film, a motor associated with said casing adapted intermittently to rotate the film within the casing, a lens whose optical axis extends at right angles to the axis of rotation of the film, means for continuously moving the lens radially with respect to the film, and means associated with the lens to direct the image at right angles to the optical axis of the lens and on to the film.

2. In apparatus of the character described, in combination, a casing adapted to contain a disc film, a motor associated with the casing for moving the film intermittently about a fixed center, a lens whose optical axis extends at right angles to the axis of rotation of the film, image bending means, a mounting common to said lens and said means, and mechanism for moving said mounting radially with respect to the film.

3. In apparatus of the character described, in combination, a film holder, a film, a film drive mechanism operative through the holder for imparting an intermittent rotation to the film, a lens whose optical axis extends at right angles to the axis of rotation of the film, a prism, a mounting common to said lens and prism, and mechanism for imparting a continuous movement to said mounting along the optical axis of said lens.

4. In apparatus of the character described, in combination, a unit including a lens, image bending means, and a rotating shutter, and means for moving continuously said unit in the direction of the optical axis of the lens, whereby the image may be bent angularly to said axis, and means for rotating the shutter at a speed predetermined in relation to the rate of movement of said unit.

5. In apparatus of the character described, in combination, a unit including a lens, image bending means, and a rotating shutter, means for continuously moving said unit along the optical axis of the lens whereby the image may be bent angularly to said axis, means for rotating the shutter at a speed predetermined in relation to the rate of movement of said unit, and a disc film adapted to receive the transmitted image and rotatable about an axis inclined to said optical axis.

6. In apparatus of the character described, in combination, a unit including a lens, image bending means, and a rotating shutter, means for continuously moving said unit along the optical axis of the lens whereby the image may be bent at right angles to said axis, a disc film adapted to receive the transmitted image and rotatable about an axis normal to said optical axis, means for intermittently rotating said film, and means for continuously rotating said shutter in timed relation to the intermittent rotation of said film.

7. In apparatus of the character described, in combination, a unit including a lens, image bending means, and a rotating shutter, means for continuously moving said unit along the optical axis of the lens, whereby the image may be bent at right angles thereto, a disc film adapted to receive the image and rotatable about an axis normal to said optical axis, means for rotating said disc, and means for rotating said shutter, all said means including a common motor.

8. In apparatus of the character described, in combination, a film holder for disc films having a normally closed exposure slot arranged radially therein, lens mechanism movable along said exposure slot, a motor, a driving connection between said motor and film and operative to rotate the film, and a drive connection between said motor and said mechanism operative to move said mechanism continuously along the exposure slot substantially the distance of one exposure during each cycle of rotation of the film.

9. In apparatus of the character described, in combination, a film holder for disc films having a normally closed exposure slot arranged radially therein, lens mechanism movable along said exposure slot, a motor, a driving connection between said motor and film and operative to rotate the film, and a drive connection between said motor and said mechanism including reduction gearing operative to move said mechanism continuously along the exposure slot substantially the distance of one exposure during each cycle of rotation of the film.

10. In apparatus of the character described, in combination, a film holder for disc films having a normally closed exposure slot arranged radially therein, lens mechanism movable along said exposure slot, a motor, a driving connection between said motor and film and operative to rotate the film, and a drive connection between said motor and said mechanism operative to move said mechanism continuously along the exposure slot substantially the distance of one exposure during each cycle of rotation of the film, and means providing an exposure opening through the normally closed exposure slot, said last-named means being movable with said lens mechanism.

11. In apparatus of the character described, in combination, a film holder for disc films having a normally closed exposure slot arranged radially therein, lens mechansm movable along said exposure slot, a motor, a driving connection between said motor and film and operative to rotate the film, and a drive connection between said motor and said mechanism including reduction gearing operative to move said mechanism continuously along the exposure slot substantially the distance of one exposure during each cycle of rotation of the film, and means providing an exposure opening through the normally closed exposure slot, said last-named means being movable with said lens mechanism.

12. In apparatus of the character described, in combination, a film holder for disc films having an exposure slot arranged radially therein, a closure for said slot having an exposure opening therein, lens mechanism movable along said exposure slot, a motor, a drive connection between the motor and the film and operative to rotate the film, a drive connection between the motor and the mechanism operative to move said mechanism continuously along the exposure slot substantially the distance of one exposure during each cycle of rotation of the film, and means for actuating said closure as said mechanism is so moved, thereby to maintain the exposure opening operatively related to the lens mechanism.

13. In apparatus of the character described, in combination, a film holder for disc film having a normally closed slot arranged radially therein, a closure therefor movable along said slot and having an exposure opening, lens mechanism movable along said slot, a motor, a drive connection between the motor and the film and operative to rotate the film, a drive connection between the motor and the mechanism operative to move said mechanism continuously along the slot substantially the distance of one exposure during each cycle of rotation of the film, said opening being operatively related to the lens of the lens mechanism, and a connection between said mechanism and the closure, whereby said closure is moved with said mechanism.

14. In apparatus of the character described, in combination, a film holder for disc film having a normally closed exposure slot arranged radially therein, lens mechanism movable along said slot, a motor, a drive connection between the motor and the film and operative to rotate the film, a drive connection between the motor and the lens mechanism operative to move said mechanism continuously along the exposure slot a distance of one exposure during each cycle of rotation of the film, a rotary shutter movable with said lens mechanism, and a drive connection between the motor and the shutter and operative to rotate said shutter at a speed predetermined in relation to the rate of rotation of the film.

15. In apparatus of the character described, in combination, a film holder for disc films having an exposure slot arranged radially therein, a closure for said slot having an exposure opening therein, lens mechanism movable along said slot, a motor, a drive connection between the motor and the film and operative to rotate the film, a drive connection between the motor and the mechanism operative to move said mechanism continuously along said exposure slot substantially the distance of one exposure during each cycle of rotation of the film, a rotary shutter movable with said lens mechanism, a drive connection between the motor and the shutter and operative to rotate the shutter at a speed predetermined in relation to the rate of rotation of the film, and means for actuating said closure as said lens mechanism is so moved, whereby to maintain said exposure opening operatively related to the lens of said lens mechanism.

16. In apparatus of the character described, in combination, a film holder for disc films having an exposure slot arranged radially therein, a closure therefor movable along said slot and having an exposure opening, lens mechanism movable along said slot, a motor, a drive connection between the motor and the film and operative to rotate the film, a drive connection between the motor and the mechanism operative to move said mechanism continuously along the slot substantially the distance of one exposure during each cycle of rotation of the film, a rotary shutter movable with said lens mechanism, a drive connection between the motor and the shutter and operative to rotate the shutter at a speed predetermined in relation to the rate of rotation of the film, said exposure opening being operatively related to the lens of the lens mechanism, and a connection between said mechanism and the closure, whereby said closure is moved with said mechanism.

17. In apparatus of the character described, in combination, a camera casing, a film holder associated therein, the holder having a radially arranged exposure slot, a lens mounting movable along the slot, a lens carried by the mounting with its optical axis extending in a plane parallel to the face of the film contained in the holder, image bending means carried by said mounting and so related to said lens and the exposure slot as to direct an image substantially at right angles to the lens axis and through the exposure slot to the film, a motor arranged in the casing, a drive connection between the motor and the film holder operative to rotate the film, and a drive connection between the motor and the mounting operative to move said mounting continuously along the slot substantially the distance of one exposure during each cycle of rotation of the film.

18. In apparatus of the character described, in combination, a camera casing, a film holder associated therein, the holder having a radially arranged slot, a movable closure for said slot having an exposure opening therein, a lens mounting movable along the slot, a lens carried by said mounting with its optical axis extending in a plane parallel to the face of the film contained in the holder, image bending means carried by said mounting and so related to said lens and the exposure opening as to direct the image substantially at right angles to the lens axis and through said opening to the film, a motor arranged in the casing, a drive connection between the motor and the holder operative to rotate the film, a drive connection between the motor and the mounting operative to move continuously said mounting along the slot substantially the distance of one exposure during each cycle of rotation of the film, and means for actuating said closure as said mounting is so moved, whereby to maintain said opening related to said image bending means as aforesaid.

19. In apparatus of the character described, in combination, a camera casing, a film holder associated therein, the holder having a radially arranged slot, a movable closure for said slot having an exposure opening therein, a lens mounting movable along the slot, a lens carried by said mounting with its optical axis extending in a plane parallel to the face of the film contained in the holder, image bending means carried by said mounting and so related to said lens and the exposure opening as to direct the image substantially at right angles to the lens axis and through said opening to the film, a motor arranged in the casing, a drive connection between the motor and the holder operative to rotate the film, a drive connection between the motor and the mounting operative to move continuously said mounting along the slot substantially the distance of one exposure during each cycle of rotation of the film, and a connection between said mounting and the slot closure whereby said closure is moved with the mounting and with the exposure opening related to said image bending means as aforesaid.

20. In apparatus of the character described, in combination, a camera casing, a film holder associated therein, a holder having a radially arranged exposure slot, a lens mounting movable along the slot, a rotary shutter carried by said mounting, a lens carried by said mounting with its optical axis extending in a plane parallel to the face of a film contained in the holder, image bending means carried by said mounting and so related to said lens and the exposure slot as to direct the image substantially at right angles to the lens axis through the slot to the film, a motor arranged in the casing, a drive connection between the motor and the mounting operative to move said mounting continuously along the slot substantially the distance of one exposure during each cycle of rotation of the film, and a drive connection between the motor and the shutter and operative to rotate the shutter at a speed predetermined in relation to the rate of rotation of the film.

21. In apparatus of the character described, in combination, a camera casing, a film holder associated therein, a holder having a radially arranged slot therein, a movable closure for said slot having an exposure opening therein, a lens mounting movable along the slot, a rotary shutter arranged on said mounting, a lens carried by said mounting with its optical axis extending in a plane parallel to the face of the film contained in the holder, image bending means carried by said mounting and so related to the lens and the exposure opening as to direct the image substantially at right angles to the lens axis and through said opening to the film, a motor arranged in the casing, a drive connection between the motor and the holder operative to rotate the film, a drive connection between the motor and the mounting operative to move continuously said mounting along the slot substantialy the distance of one exposure during each cycle of rotation of the film, a drive connection between the motor and the shutter and operative to rotate the shutter at a speed predetermined in relation to the rate of rotation of the film, and means for actuating said slot closure as said mounting is moved, whereby to maintain said exposure opening related to said image bending means as aforesaid.

22. In apparatus of the character described, in combination, a camera casing, a film holder associated therein, a holder having a radially arranged slot therein, a movable closure for said slot having an exposure opening therein, a lens mounting movable along the slot, a rotary shutter arranged on said mounting, a lens carried by said mounting with its optical axis extending in a plane parallel to the face of the film contained in the holder, image bending means carried by said mounting and so related to the lens and the exposure opening as to direct the image substantially at right angles to the lens axis and through said opening to the film, a motor arranged in the casing, a drive connection between the motor and the holder operative to rotate the film, a drive connection between the motor and the mounting operative to move continuously said mounting along the slot substantially the distance of one exposure during each cycle of rotation of the film, a drive connection between the motor and the shutter and operative to rotate the shutter at a speed predetermined in relation to the rate of rotation of the film, and a connection between the mounting and the slot closure whereby said closure is moved with the mounting and with the exposure opening related to said image bending means as aforesaid.

CURTIS D. CHASE.